US011151155B2

(12) United States Patent
Todd

(10) Patent No.: US 11,151,155 B2
(45) Date of Patent: *Oct. 19, 2021

(54) MEMORY USE IN A DISTRIBUTED INDEX AND QUERY SYSTEM

(71) Applicant: VMware, Inc., Palo Alto, CA (US)

(72) Inventor: Christopher Todd, Fircrest, WA (US)

(73) Assignee: VMware, Inc., Palo Alto, CA (US)

(*) Notice: Subject to any disclaimer, the term of this patent is extended or adjusted under 35 U.S.C. 154(b) by 520 days.

This patent is subject to a terminal disclaimer.

(21) Appl. No.: 15/653,106

(22) Filed: Jul. 18, 2017

(65) Prior Publication Data

US 2019/0026317 A1  Jan. 24, 2019

(51) Int. Cl.
| | |
|---|---|
| *G06F 16/27* | (2019.01) |
| *G06F 9/50* | (2006.01) |
| *G06F 16/93* | (2019.01) |
| *G06F 16/22* | (2019.01) |
| *G06F 16/31* | (2019.01) |
| *G06F 12/0871* | (2016.01) |
| *G06F 12/0868* | (2016.01) |
| *G06F 12/02* | (2006.01) |
| *G06F 12/128* | (2016.01) |

(52) U.S. Cl.
CPC .......... *G06F 16/27* (2019.01); *G06F 9/5016* (2013.01); *G06F 12/023* (2013.01); *G06F 12/0868* (2013.01); *G06F 12/0871* (2013.01); *G06F 16/2237* (2019.01); *G06F 16/31* (2019.01); *G06F 16/93* (2019.01); *G06F 12/128* (2013.01); *G06F 2212/1024* (2013.01); *G06F 2212/1044* (2013.01); *G06F 2212/311* (2013.01); *G06F 2212/401* (2013.01); *G06F 2212/463* (2013.01); *G06F 2212/621* (2013.01)

(58) Field of Classification Search
CPC .................................................. G06F 16/1744
See application file for complete search history.

(56) References Cited

U.S. PATENT DOCUMENTS

| | | | |
|---|---|---|---|
| 6,040,917 A | 3/2000 | Campbell et al. | |
| 9,432,298 B1* | 8/2016 | Smith | ................. H04L 49/9057 |
| 2004/0030847 A1 | 2/2004 | Tremaine | |
| 2012/0089662 A1* | 4/2012 | Ramadas | ............ G06F 16/9574 709/202 |
| 2015/0019514 A1* | 1/2015 | Forster | ................... G06Q 40/12 707/693 |
| 2016/0328488 A1* | 11/2016 | Lytle | ......................... G06F 9/54 |

(Continued)

*Primary Examiner* — Mohammad S Rostami

(57) ABSTRACT

In a method of memory use in a distributed index and query system, a processing thread serializes a list of documents into a first memory object exclusively borrowed from a memory object pool of a memory to achieve a first segment comprising a serialized data array of the documents, an offset index, and a document count. The serialized data array is compressed by the processing thread into a second memory object exclusively borrowed from the memory object pool to achieve a second segment comprising a compressed serialized data array, the offset index, and the document count. Subsequent to the compression, the first memory object is release back to the memory object pool. The second segment is written to a data storage device, and subsequent to the writing, the second memory object is released back to the memory object pool.

20 Claims, 11 Drawing Sheets

(56) References Cited

U.S. PATENT DOCUMENTS

2017/0235513 A1* 8/2017 Zhang .................... H04L 67/06
  711/154
2018/0262573 A1* 9/2018 Przybylski ............... G06F 8/20
2019/0205244 A1* 7/2019 Smith .................... G06F 12/12

* cited by examiner

600

SERIALIZING, BY A FIRST PROCESSING THREAD OF A PLURALITY OF PROCESSING THREADS, A LIST OF DOCUMENTS INTO A FIRST MEMORY OBJECT EXCLUSIVELY BORROWED BY THE FIRST PROCESSING THREAD FROM A MEMORY OBJECT POOL OF A MEMORY TO ACHIEVE A FIRST SEGMENT COMPRISING A SERIALIZED DATA ARRAY OF THE DOCUMENTS, AN OFFSET INDEX DESCRIBING LOCATIONS OF THE DOCUMENTS IN THE SERIALIZED DATA ARRAY, AND A DOCUMENT COUNT DESCRIBING A NUMBER OF THE DOCUMENTS
605

↓

COMPRESSING, BY THE FIRST PROCESSING THREAD, THE SERIALIZED DATA ARRAY INTO A SECOND MEMORY OBJECT EXCLUSIVELY BORROWED BY THE FIRST PROCESSING THREAD FROM THE MEMORY OBJECT POOL TO ACHIEVE A SECOND SEGMENT COMPRISING A COMPRESSED SERIALIZED DATA ARRAY, THE OFFSET INDEX, AND THE DOCUMENT COUNT
610

↓

SUBSEQUENT TO THE COMPRESSING, RELEASING THE FIRST MEMORY OBJECT BACK TO THE MEMORY OBJECT POOL FOR EXCLUSIVE BORROWING BY ANY PROCESSING THREAD OF THE PLURALITY OF PROCESSING THREADS
615

↓

WRITING THE SECOND SEGMENT TO A DATA STORAGE DEVICE
620

↓

SUBSEQUENT TO THE WRITING, RELEASING THE SECOND MEMORY OBJECT BACK TO THE MEMORY OBJECT POOL FOR EXCLUSIVE BORROWING BY ANY PROCESSING THREAD OF THE PLURALITY OF PROCESSING THREADS
625

IN RESPONSE TO A QUERY FOR A DOCUMENT IN THE SECOND SEGMENT BEING UNSATISFIED BY CONTENT OF A CACHE OF THE MEMORY, READING, BY A SECOND PROCESSING THREAD OF THE PLURALITY OF PROCESSING THREADS, THE SECOND SEGMENT FROM THE DATA STORAGE DEVICE INTO A THIRD MEMORY OBJECT EXCLUSIVELY BORROWED BY THE SECOND PROCESSING THREAD FROM THE MEMORY OBJECT POOL
630

DECOMPRESSING, BY THE SECOND PROCESSING THREAD, THE COMPRESSED SERIALIZED DATA ARRAY INTO A FOURTH MEMORY OBJECT EXCLUSIVELY BORROWED BY THE SECOND PROCESSING THREAD FROM THE MEMORY OBJECT POOL TO RE-ACHIEVE THE FIRST SEGMENT COMPRISING THE SERIALIZED DATA ARRAY, THE OFFSET INDEX, AND THE DOCUMENT COUNT
635

SUBSEQUENT TO THE DECOMPRESSING, RELEASING THE THIRD MEMORY OBJECT BACK TO THE MEMORY OBJECT POOL FOR EXCLUSIVE BORROWING BY ANY PROCESSING THREAD OF THE PLURALITY OF PROCESSING THREADS
640

DE-SERIALIZING, BY THE SECOND PROCESSING THREAD, THE DOCUMENT FROM THE FOURTH MEMORY OBJECT TO SATISFY THE QUERY
645

ASSIGNING THE FOURTH MEMORY OBJECT TO THE CACHE FOR READ-ONLY ACCESS BY ONE OR MORE OF THE PLURALITY OF PROCESSING THREADS
650

IN RESPONSE TO A QUERY BEING UNSATISFIED BY CONTENT OF A CACHE WITHIN A MEMORY, READING, BY A PROCESSING THREAD OF A PLURALITY OF PROCESSING THREADS, A FIRST SEGMENT FROM A DATA STORAGE DEVICE INTO A FIRST MEMORY OBJECT EXCLUSIVELY BORROWED BY THE PROCESSING THREAD FROM A MEMORY OBJECT POOL OF THE MEMORY, THE FIRST SEGMENT COMPRISING A COMPRESSED SERIALIZED DATA ARRAY, AN OFFSET INDEX DESCRIBING LOCATIONS OF DOCUMENTS IN AN UNCOMPRESSED VERSION OF THE COMPRESSED SERIALIZED DATA ARRAY, AND A DOCUMENT COUNT DESCRIBING A NUMBER OF THE DOCUMENTS IN THE COMPRESSED SERIALIZED DATA ARRAY
730

↓

DECOMPRESSING, BY THE PROCESSING THREAD, THE COMPRESSED SERIALIZED DATA ARRAY INTO A SECOND MEMORY OBJECT EXCLUSIVELY BORROWED BY THE PROCESSING THREAD FROM THE MEMORY OBJECT POOL TO ACHIEVE A SECOND SEGMENT COMPRISING THE DECOMPRESSED VERSION OF THE SERIALIZED DATA ARRAY, THE OFFSET INDEX, AND THE DOCUMENT COUNT
735

↓

SUBSEQUENT TO THE DECOMPRESSING, RELEASING THE FIRST MEMORY OBJECT BACK TO THE MEMORY OBJECT POOL FOR EXCLUSIVE BORROWING BY ANY PROCESSING THREAD OF THE PLURALITY OF PROCESSING THREADS
740

↓

DE-SERIALIZING, BY THE PROCESSING THREAD, A DOCUMENT FROM THE SECOND MEMORY OBJECT TO SATISFY THE QUERY
745

↓

ASSIGNING THE SECOND MEMORY OBJECT TO THE CACHE FOR READ-ONLY ACCESS BY ONE OR MORE OF THE PLURALITY OF PROCESSING THREADS
750

RESPONSIVE TO DETERMINING A SECOND QUERY IS SATISFIED BY CONTENT OF THE SECOND MEMORY OBJECT IN THE CACHE, INCREMENTING A REFERENCE COUNT ASSOCIATED WITH THE CACHED SECOND MEMORY OBJECT
760

DE-SERIALIZING ONE OR MORE DOCUMENTS FROM THE FROM THE SECOND MEMORY OBJECT TO SATISFY THE SECOND QUERY
762

SUBSEQUENT TO THE DE-SERIALIZING THE ONE OR MORE DOCUMENTS, DECREMENTING THE REFERENCE COUNT
764

INCREMENTING A REFERENCE COUNTER ASSOCIATED WITH THE SECOND MEMORY OBJECT
770

FIG. 7C

MEMORY USE IN A DISTRIBUTED INDEX AND QUERY SYSTEM

BACKGROUND

Some examples of modern distributed computing systems include networked computers, net servers, and larger enterprise systems. These and other distributed computing systems often involve databases that contain bundles of textual data, which can be thought of and referred to as "documents," and which may be indexed and queried.

A distributed index and query system processes incoming documents to create a searchable index while at the same time processing queries on the index or indexes and documents indexed therein. In a resource constrained environment, the index and query tasks compete for system resources such as: network throughput, bus bandwidth, memory, disk speed, various cache sizes, and processor usage. Contention between resources and/or problems in scheduling index and query tasks results in poor performance of the system. Poor performance may be evidenced by a slowdown in indexing new documents, a slowdown in querying response times, or a slowdown of both tasks.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 6A-6F illustrate a flow diagram of a method of memory use in a distributed index and query system, in accordance with various embodiments.

FIGS. 7A-7E illustrate a flow diagram of a method of memory use in a distributed index and query system, in accordance with various embodiments.

DESCRIPTION OF EMBODIMENTS

Figure 1:
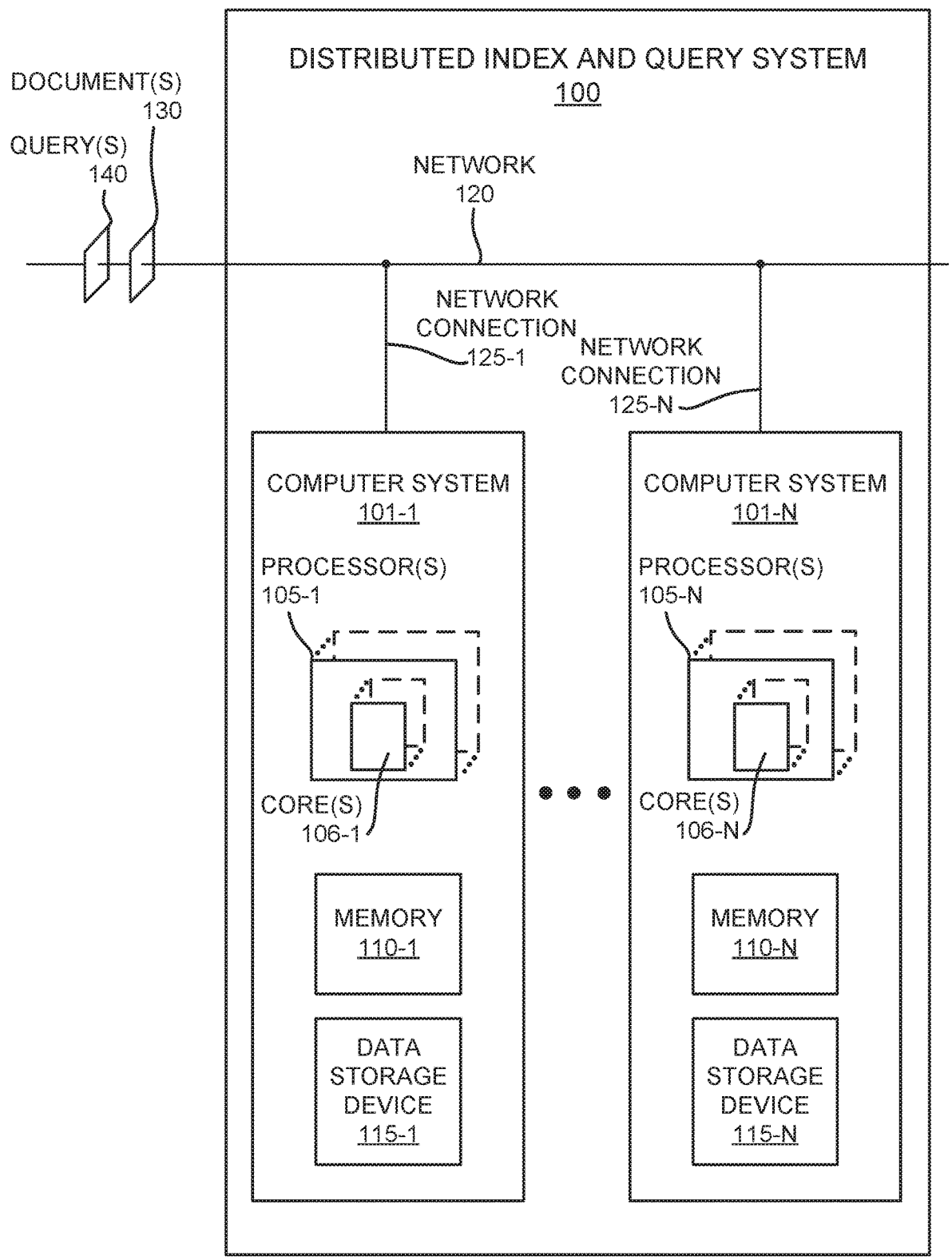
FIG. 1 is an example block diagram of a distributed index and query system that includes a plurality of networked computer systems, in accordance with embodiments.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments. In general, embodiments described herein provide for improvements in and operational efficiency increases in computing systems (such as computing systems that perform both index and query of documents).

Notation and Nomenclature

Unless specifically stated otherwise as apparent from the following discussions, it is appreciated that throughout the present Description of Embodiments, discussions utilizing terms such as "serializing," "compressing," "releasing," "writing," "reading," "decompressing," "de-serializing," "assigning," "incrementing," "decrementing," "evicting," "allowing," "returning," "swapping," "allocating," "reallocating," "using," or the like, often refer to the actions and processes of an electronic computing device or system, such as an index and query system or a distributed computing system, as but two examples. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

A distributed index and query system processes documents into a searchable format. These documents are text based files that are processed in batches, stored as a list of documents. In order to write and read these lists of documents from memory onto a data storage device (such as a hard disk drive) for long term storage, the list of documents is serialized into an array of bytes and compressed. In order to read one or more of the stored documents from the data storage device, an array of bytes must be read from data storage device, decompressed, and de-serialized. The performance of a distributed index and query system is directly tied to how many times and how efficiently this storage and retrieval happens. In particular, the rapid allocation of variable sized byte arrays from memory for the serializing, compressing, decompressing, and de-serializing can lead to long delays while a memory manager in the system allocates an exact amount of memory and/or collects and compacts previously allocated memory so that it can be reallocated. Herein, techniques are described which speed this allocation process and eliminate many instances of collection and/or compaction, thus speeding overall allocation of memory and processes that depend upon the allocation of memory. As described herein, the memory of a distributed index and query system include both a cache and a memory object pool.

A memory object from the memory object pool can be exclusively borrowed by a processing thread, which then has exclusive read/write access to the memory addresses of the memory object while borrowing it. Typically, after the processing thread is finished with a task that required it to borrow the memory object, the processing thread releases the memory object back to the memory object pool where it can be then be borrowed by any other processing thread. An exception is that a memory object that contains data that has been decompressed may be placed in the cache, in case another query needs access to one or more documents that have just been decompressed. With the borrowing, no effort is expended by the memory manager to allocate an exact size of memory to a memory object. Whatever size the memory object is, is what is borrowed; and at any given time some or all memory objects in the memory object pool may have different sizes from one another. If the memory object is too big for the task being conducted by the processing thread, the processing thread may use the memory object without the memory manager trimming the size. If it is too small for the task being conducted by the processing thread, the memory manager allocates additional memory to the memory object and the memory object is grown and will be larger when it is finally released back to the memory object pool. This pooling technique, reduces or eliminates the need for compaction after use of memory and streamlines the allocation of memory as very little time is spent by the memory manager altering the size of a memory object that is allocated—typically only, when the size needs to be increased.

Discussion begins with a description of an example distributed index and query system that includes multiple computer systems. Operation of various components of the distributed index and query system is described. Techniques for using the memory object pool and cache are illustrated and described. Descriptions of serialization, compression, de-compression, and de-serialization are provided in conjunction with illustration of various stages in the life-cycle of a segment that includes a serialized list of documents. Operation of various components of a query and indexing system are further described in conjunction with description of various methods of memory use.

Example Distributed Index and Query System

FIG. 1 is an example block diagram of a distributed index and query system 100 that includes a plurality of networked computer systems (101-1 . . . 101-N), in accordance with embodiments. As depicted in FIG. 1, distributed index and query system 100 includes a plurality of computer systems 101 (101-1 . . . 101-N) communicatively coupled with a network 120. Computer system 101-1 is communicatively coupled to network 120 by network connection 125-1, which may comprise a network interface card or other communicative coupling mechanism. Similarly, computer system 101-N is communicatively coupled to network 120 by network connection 125-N, which may comprise a network interface card or other communicative coupling mechanism. Although only two computer systems 101 (101-1 and 101-N) are illustrated in distributed index and query system 100, more may be included in some embodiments.

Network 120 operates to communicatively couple computer systems 101 (e.g., 101-1 . . . 101-N) with one another as part of a network and to facilitate receipt of documents 130 for indexing, and queries 140 for processing.

Computer system 101-1 includes one or more processors 105-1. Computer system 101-1 includes or has access to a memory 110-1 and a data storage device 115-1. Each included processor 105-1 includes one or more processing cores 106-1. Memory 110-1 typically comprises random access memory. Data storage device 115-1 typically comprises one or some combination of magnetic disks and tapes, solid state drives/"disks," optical disks, and/or direct access storage devices such as hard disk drives.

Computer system 101-N includes one or more processors 105-N. Computer system 101-N includes or has access to a memory 110-N and a data storage device 115-N. Each included processor 105-N includes one or more processing cores 106-N. Memory 110-N typically comprises random access memory. Data storage device 115-N typically comprises one or some combination of magnetic disks and tapes, solid state drives/"disks," optical disks, and/or direct access storage devices such as hard disk drives.

The number of processing cores 106 in a processor 105 defines the total number of processing threads available in that processor, where one processing core equates to one processing thread. Adding up the total number of processing cores 106 in the total number of processors 105 in computer system 101 provides the total number of processing threads available in that computer system 101. In distributed index and query system 100, the total number of processing threads is determined by adding up the processing threads of each computer system 101 (e.g., 101-1 . . . 101-N) in the distributed index and query system 100. Some portion of the total number of processing threads in distributed index and query system 100 may be utilized for indexing documents, such as document(s) 130, received via a network connection 125 to network 120. Similarly, some portion of the total number of processing threads in distributed index and query system 100 may be utilized for processing and responding to queries of indexed documents, such as query 140, received via a network connection 125 to network 120.

Figure 2A:
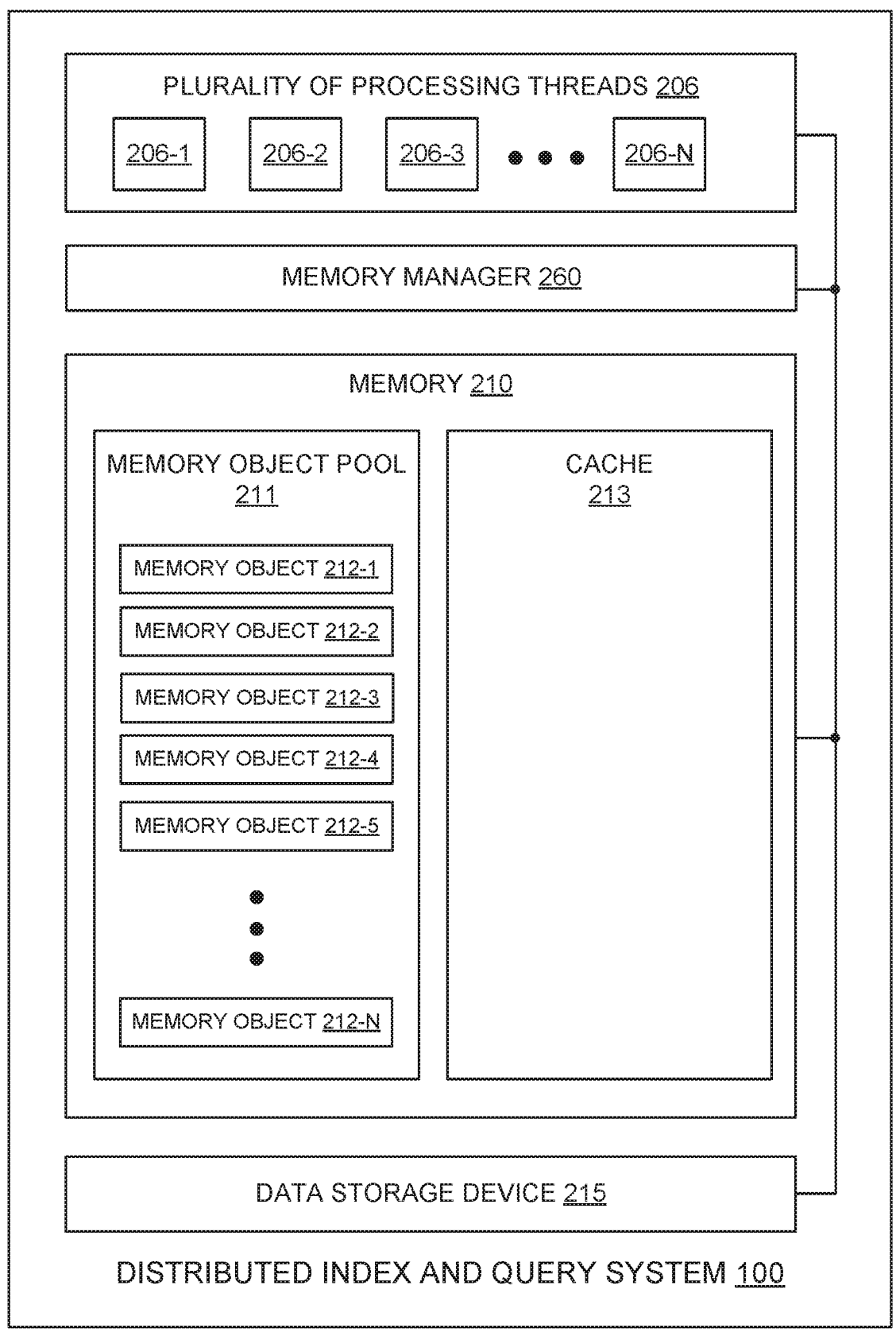
FIG. 2A illustrates an example of distributed index and query system with a memory configured with both a cache and a memory object pool, in accordance with an embodiment.
Figure 2B:
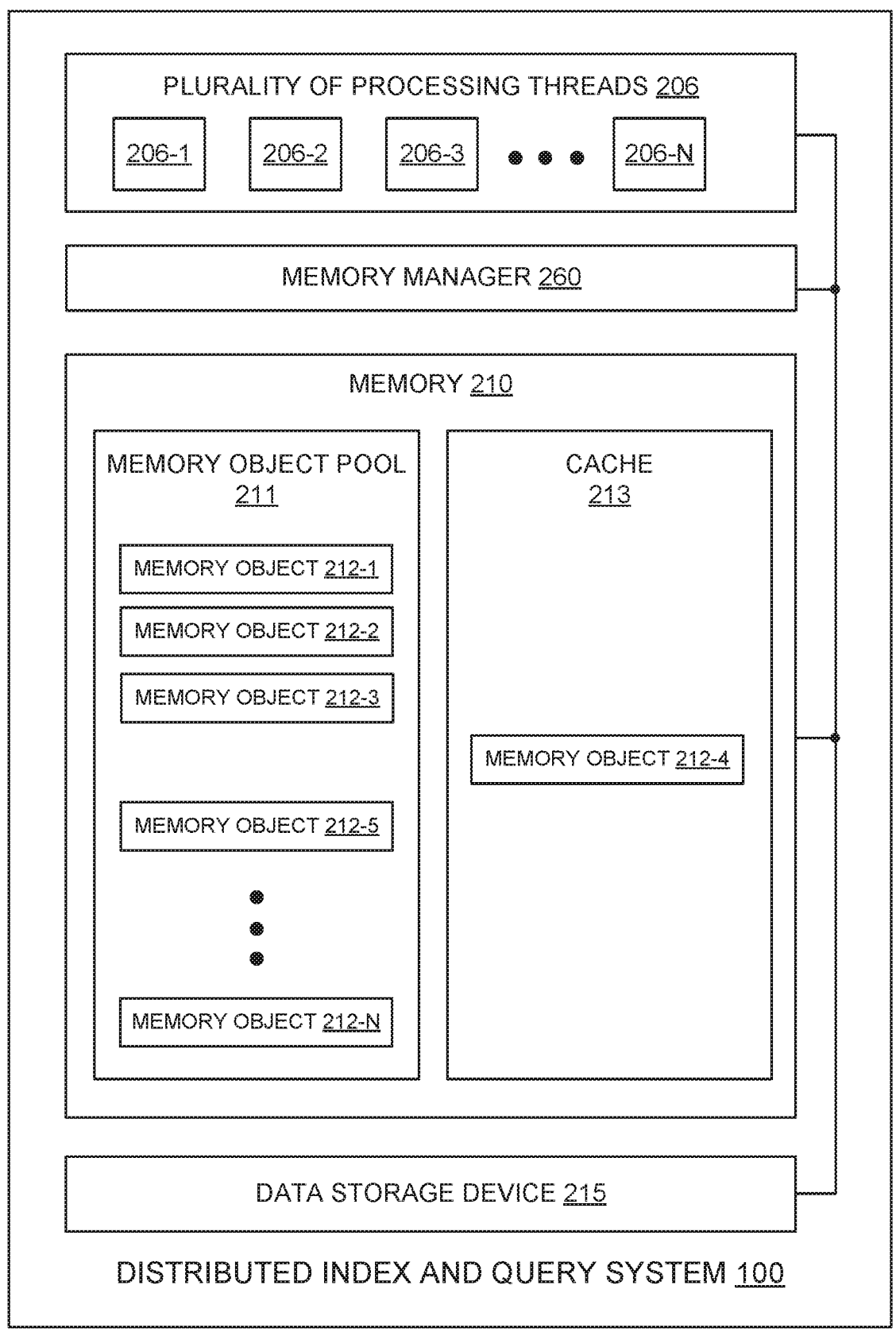
FIG. 2B illustrates an example of memory object being stored in the cache of a distributed index and query system, in accordance with an embodiment.

FIG. 2A illustrates an example of distributed index and query system with a memory 210 configured with both a cache 213 and a memory object pool 211, in accordance with an embodiment. In FIGS. 2A and 2B, memory 210 is an abstraction which is made up of all or part of one or more of the memories 110 depicted in FIG. 1. Similarly, data storage device 215 is an abstraction which is made up of all or part of one or more of the data storage devices 115 depicted in FIG. 1. Plurality of processing threads 206 is made up from processing threads (206-1, 206-2, 206-3 . . . 206-N) provided from the total number of processing threads (provided by processing cores 106) available across distributed index and query system 100. Individual processing threads in plurality of processing threads 206 are allocated for use in tasks such as indexing received documents 130 and responding to received queries 140. Memory manager, may be implemented with its own processors and hardware and/or with one or more processing threads 206.

Memory object pool 211 is a collection of memory objects 212 (212-1, 212-2, 212-3, 212-4, 212-5 . . . 212-N) that are available for use by processing threads 206 through a process called "borrowing." When a memory object 212 is "borrowed" from the memory object pool it is exclusively borrowed and owned by the caller (e.g., a processing thread such as processing thread 206-1), which has exclusive read access and exclusive write access to the borrowed memory object 212. Once the memory object 212 is no longer needed by the borrower, it is released back to the memory object pool 211 so another processing thread can borrow it and use it.

In an initial state of distributed index and query system 100, all of the memory objects may be allocated by memory manager 260 as byte arrays which may be sufficiently large to handle most common tasks within distributed index and query system 100. In this initial state, memory objects 212 may start at the same or similar size as one another, but the sizes may then change over time as various memory objects increase or decrease in size.

When borrowed, if the size of the byte array in the borrowed memory object 212 (e.g., memory object 212-1) is larger than what is needed for the task being carried out by the borrower, the memory object 212 can be used without allocating new memory. That is, the memory may not be trimmed down to size if it is too large, rather it is just used as is in order to eliminate the time and processing that would be required to trim it to a specific size and then compact the trimmed portion back into memory 210.

Cache 213 is a collection of memory objects that are read-only. For example, if a memory object 212 is placed in cache, it becomes read-only. Multiple processing threads can find memory object 212 in cache 213 and read from it. When cache 213 has grown past a certain size threshold one or more memory objects 212 will be evicted and no longer found in cache 213. If not being called when the eviction occurs, the evicted memory object 212 may be released to memory object pool 211 so that it can be borrowed by any processing thread 206. As will be described further, one or more calling processing threads 206 may still use a memory object 212 that has been ejected while called by the processing thread(s). Eventually, when all calls to an evicted memory object 212 cease, the evicted memory object may be released back to memory object pool 211 so that it can be borrowed by any processing thread 206.

FIG. 2B illustrates an example of memory object 212 (memory object 212-4 in this example) object being stored in the cache 213 of a distributed index and query system 100, in accordance with an embodiment. If evicted from cache 213, memory object 212-4 will no longer appear in cache 213 for new calls. After eviction, and once any in process calls are complete, memory object 212-4 is returned to memory object pool 211 as previously depicted in FIG. 2A.

Segments, Serialization, Compression, Decompression, and De-Serialization

Figure 3:
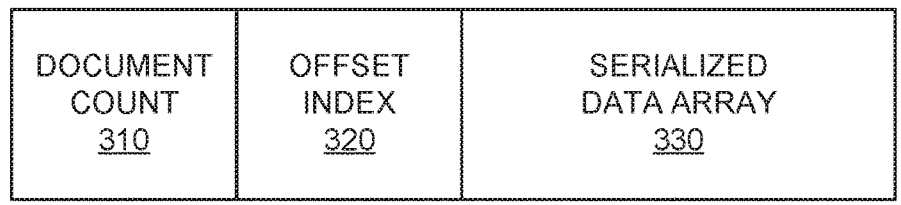
FIG. 3 illustrates an example of a segment with documents stored as a serialized data array, in accordance with an embodiment.

FIG. 3 illustrates an example of a segment 300 with documents stored as a serialized data array 330, in accordance with an embodiment. Segment 300 is a data structure that includes the number of documents serialized, an array of offsets for each of the serialized documents, and the byte array of the serialized documents. Consider an example where processing thread 206-1 receives a list of documents 130 for indexing. In one embodiment, processing thread 206-1 borrows a memory object 212-1 from memory object pool 211. Processing thread 206-1 then serializes the data of the documents 130 into a serialized data array 330, with one document following the next in a serial fashion, that is held as part of segment 300 within memory object 212-1. Each document 130 is variable in size, so the size of the serialized data array 330 and positions of the individual documents 130 within it are not known until all documents 130 are serialized. As part of the serialization, processing thread 206-1 counts the number of documents 130 serialized and keeps this number as a document count 310 as part of segment 300 in memory object 212-1. Also, as part of the serialization, processing thread 206-1 keeps an offset index 320 that provides an index of offsets, in data bytes, within serialized data array 330 to locate the beginning point of each of the documents that has been serialized into serialized data array 330.

In some embodiments, processing thread 206-1 introduces an integer value to segment 300 representing the number of bytes used in segment 300 or in serialized data array 330 in addition to the allocated size of the memory object 212-1 which holds segment 300. This integer provides information available to memory manager 260 that allows memory manager 260 to re-use over-allocated bytes by pooling the over allocated bytes with other over allocated bytes to create another memory object 212.

In some embodiments, processing thread 206-1 interacts with memory manager 260 to have additional bytes allocated to memory object 212-1 if it is not large enough to contain serialized data array 330. This grows the size of the memory object 212-1 when the additionally allocated bytes are added.

Figure 4:
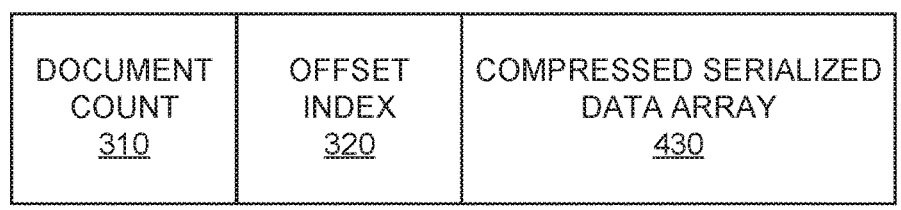
FIG. 4 illustrates an example of a segment with documents stored as compressed serialized data array, in accordance with an embodiment.

FIG. 4 illustrates an example of a segment 400 with documents stored as a compressed serialized data array 430, in accordance with an embodiment. Consider the previous example described in conjunction with FIG. 3. Once processing thread 206-1 has created serialized segment 300, in one embodiment, the serialized data array is compressed. To perform the compression, processing thread 206-1 borrows a second memory object, memory object 212-2, from memory object pool 211 and then compresses serialized data array 330 of segment 300 from memory object 212-1 into compressed serialized data array 430 in a new segment 400 maintained in memory object 212-2. Any known compression technique can be used. It should be appreciated that the size of the resulting compressed serialized data array 430 is not known until after compression is complete, and is not guaranteed to be smaller than the original. In general, the size of the list of objects serialized in to serialized data array 330 needs to be large enough that compression is effective. Segment 400 also includes document count 310 and offset index 320, neither of which is compressed. In one embodiment, processing thread 206-1 copies one or both of document count 310 and offset index 320 from memory object 212-1 into segment 400 within memory object 212-2. In another embodiment, processing thread 206-1 foregoes the time and processing associated with copying and just swaps the bytes (i.e., the memory addresses) containing of one or both of document count 310 and offset index 320 from memory object 212-1 into segment 400 within memory object 212-2. This swapping decreases the size of segment 300 and increases the size of segment 400. Once segment 400 has been created, processing thread 206-1 releases memory object 212-1 back to memory object pool 211 where it is once again available to be borrowed by any of the plurality of processing threads 206. Processing thread 206-1 then writes segment 400 into storage on data storage device 215. After the writing is complete, processing thread 206-1 releases memory object 212-2 back to memory object pool 211 where it is once again available to be borrowed by any of the plurality of processing threads 206.

In some embodiments, processing thread 206-1 interacts with memory manager 260 to have additional bytes allocated to memory object 212-2 if it is not large enough to contain compressed serialized data array 430. This grows the size of the memory object 212-2 when the additionally allocated bytes are added.

Figure 5:
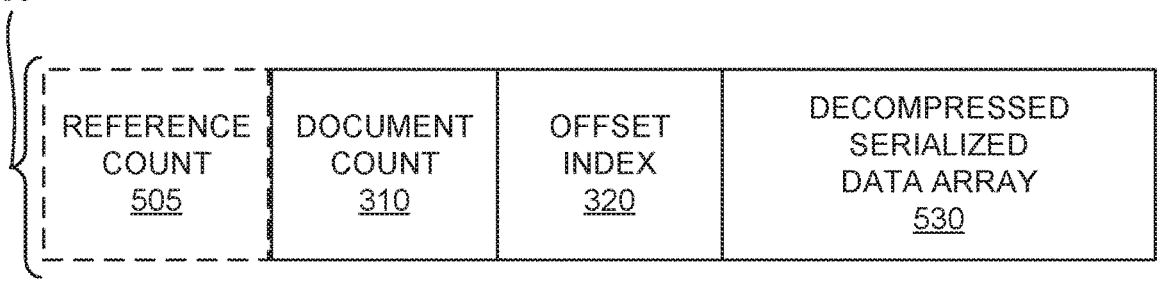
FIG. 5 illustrates an example of a segment with documents stored as a decompressed serialized data array, in accordance with an embodiment.

FIG. 5 illustrates an example of a segment 500 with documents 130 stored as a decompressed serialized data array 530, in accordance with an embodiment. Segment 500 is created by reading segment 400 from data storage device 215 and decompressing the compressed serialized data array 430 to create decompressed serialized data array 530. Each document 130 serialized into the serialized data array 330 (and the identical decompressed serialized data array 530) can be de-serialized directly if the offset within the serialized data array is known, which is why offset index 320 is maintained. When a query 140 requires a particular document 130, a processing thread, such as processing thread 206-2, locates on data storage device 215 the segment 400 containing the compressed serialized data array 430 which holds the document 130. Processing thread 206-2 borrows a memory object (e.g., memory object 212-3) from memory object pool 211 and reads segment 400 from data storage device 215 into memory object 212-3. Processing thread 206-2 borrows another memory object (e.g., memory object 212-4) from memory object pool 211 and decompresses compressed serialized data array 430 into segment 500, within memory object 212-4, as decompressed serialized data array 530. Document count 310 and offset index 320 are then swapped (or in some instances copied) from segment 400 to segment 500. After the decompression is complete, processing thread 206-2 releases memory object 212-3 back to memory object pool 211 where it is once again available to be borrowed by any of the plurality of processing threads 206. Processing thread 206-2 can de-serialize the queried document 130 from decompressed serialized data array 530 using the offset index 320 to find it.

In some embodiments, processing thread 206-2 interacts with memory manager 260 to have additional bytes allocated to memory object 212-3 or 212-4 if either is not large enough. This grows the size of the memory object when the additionally allocated bytes are added.

Due to the time and processing expense of reading and decompressing segment 500, in some embodiments processing thread 206-2 assigns segment 500 and memory object 212-4 to cache 213, for read-only access, to amortize the time and expense of the retrieval and decompression over additional reads of one or more documents in segment 500 while cached. This is depicted in FIG. 2B. In some embodiments, this assignment to the cache includes associating a reference count 505 with segment 500 and/or memory object 212-4. For example, the reference count may be added on to segment 500 in some embodiments. The reference count is set at one when memory object 212-4 is assigned to cache 213. The reference count is further incremented by one while being called (read) by a processing thread, and decremented by one when the call is complete. When room is needed in cache 213 causing memory object 212-4 to be ejected, the reference count 505 is decremented upon the ejection, and when it reaches zero it is released back to memory object pool 211.

Example Methods of Operation

The following discussion sets forth in detail the operation of some example methods of operation of embodiments. With reference to FIGS. 6A-6F and FIGS. 7A-7E, flow diagrams 600 and 700 illustrate example procedures used by various embodiments. Flow diagrams 600 and 700 include some procedures that, in various embodiments, are carried out by a processor under the control of computer-readable and computer-executable instructions. In this fashion, procedures described herein and in conjunction with flow diagrams 600 and/or 700 are, or may be, implemented using a computer system (which may be a distributed computer system), in various embodiments. The computer-readable and computer-executable instructions can reside in any non-transitory computer readable storage media. Some non-limiting examples of non-transitory computer readable storage media include random access memory, read-only memory, magnetic disks and tapes, solid state drives/ "disks," optical disks, direct access storage devices, any or all of which may be employed with a computing system such as distributed computing system 100. The computer-readable and computer-executable instructions, which reside on non-transitory computer readable storage media, are used to control or operate in conjunction with, for example, one or some combination of processors of distributed index and query system 100, a computer system 101, or the like. It is appreciated that the processor(s) may be physical or virtual or some combination (it should also be appreciated that a virtual processor is implemented on physical hardware). Although specific procedures are disclosed in flow diagrams 600 and 700, such procedures are examples. That is, embodiments are well suited to performing various other procedures or variations of the procedures recited in flow diagram 600 and/or 700. Likewise, in some embodiments, the procedures in flow diagrams 600 and/or 700 may be performed in an order different than presented and/or not all of the procedures described in one or more of these flow diagrams may be performed. It is further appreciated that procedures described in flow diagram 600 and/or 700 may be implemented in hardware, or a combination of hardware with firmware and/or software.

FIG. 6A is a flow diagram 600 of a method of memory use in a distributed index and query system (such as distributed index and query system 100), in accordance with various embodiments. Reference is made to items in FIGS. 1, 2A, 2B, 3, 4, and 5 in the description of flow diagram 600.

At 605 of flow diagram 600, in one embodiment, the method, serializes a list of documents 130 into a first memory object (e.g., memory object 212-1) exclusively borrowed by the first processing thread from a memory object pool 211 of a memory 210 to achieve a first segment 300 comprising a serialized data array of the documents 130, an offset index 320 describing locations of the documents in the serialized data array 330, and a document count 310 describing a total number of the documents that have been serialized. The serializing is accomplished by a first processing thread (e.g., processing thread 206-1) of a plurality of processing threads 206. The documents 130 are received via a connection to network 120. The list may contain many documents, such as 10, 100, 1000, or more documents. Generally, a sufficient number is required in order to make compression of them worthwhile and effective.

In response to the first memory object 212-1 containing fewer memory bytes than needed for achieving the first segment processing thread 206-1 communicates with memory manager 260 and to affect the allocation of additional memory bytes from the memory 210 to the first memory object 212-1 to increase an overall size of the first memory object 212-1. In some embodiments, no attempt is made to determine an exact number of bytes needed. Instead a round number in kilobytes such as 1 kilobyte, 16 kilobytes, 128 kilobytes, is additionally allocated. This saves time over trying to determine an exact amount to add, and if over allocation occurs it may prevent the need to incrementally allocate more and more memory.

Conversely, in some embodiments, in response to the first memory object 212-1 containing excess memory bytes over what are needed for achieving the first segment 300, the first memory object is simply used without trimming the excess memory bytes from the first memory object. This foregoes the time and processing expense of trimming the extra bytes away and then compacting memory 210 after they are trimmed.

At 610 of flow diagram 600, in one embodiment, the method compresses the serialized data array 330 into a second memory object (e.g., 212-2) exclusively borrowed by the first processing thread 206-1 from the memory object pool 211 to achieve a second segment 400 comprising a compressed serialized data array 430, the offset index 320, and the document count 310. The compressing can be accomplished by processing thread 206-1. In some embodiments, the offset index is moved from segment 300 to segment 400 by swapping bytes comprising the offset index 320 from the first memory object 212-1 into the second memory object 212-2. This swapping is faster and less resource intensive than copying (which may occur in other embodiments).

At 615 of flow diagram 600, in one embodiment, subsequent to the compressing described at 610, the method releases the first memory object 212-2 back to the memory object pool 211 for exclusive borrowing by any processing thread of the plurality of processing threads 206. For example, the borrowing processing thread (e.g., processing thread 206-1) releases memory object 212-1 and it returns to memory object pool 211.

At 620 of flow diagram 600, in one embodiment, the method writes the second segment 400 to a data storage device 215. This can comprise processing thread 206-1 performing the writing.

At 625 of flow diagram 600 subsequent to the writing, in one embodiment, the method releases the second memory object 212-2 back to the memory object pool 211 for exclusive borrowing by any processing thread of the plurality of processing threads 206. For example, the borrowing processing thread (e.g., processing thread 206-1) releases memory object 212-2 and it returns to memory object pool 211.

Referring now to FIG. 6B in response to a query 140 for a document in the second segment 400 being unsatisfied by content of a cache 213 of the memory 210, at 630 of flow diagram 600, in one embodiment, the method as described in 605-625 further comprises reading, by a second processing thread (e.g., processing thread 206-2) of the plurality of processing threads, the second segment 400 from the data storage device 215 into a third memory object (e.g., memory object 212-3) exclusively borrowed by the second processing thread 206-2 from the memory object pool 211. The cache 213 is checked to see if perhaps the second segment has already been read, decompressed, and cached.

At 635 of flow diagram 600, in one embodiment, the method as described in 605-630 further comprises decompressing, by the second processing thread 206-2, the compressed serialized data array 430 into a fourth memory object 212-4 exclusively borrowed by the second processing thread 206-2 from the memory object pool 211 to re-achieve the first segment 300 comprising the serialized data array 330, the offset index 320, and the document count 310. With reference to FIGS. 3 and 6B, decompressed serialized data array 530 should be identical to serialized data array 330 after compressed serialized data array 430 is decompressed.

At 640 of flow diagram 600, in one embodiment subsequent to the decompressing, the method as described in 605-635 further comprises, releasing the third memory object 212-3 back to the memory object pool 211 for exclusive borrowing by any processing thread of the plurality of processing threads 206.

At 645 of flow diagram 600, in one embodiment, the method as described in 605-640 further comprises de-serializing, by the second processing thread 206-2, the queried document from segment 500 in the fourth memory object 212-4 in order to satisfy the query 140.

At 650 of flow diagram 600, in one embodiment, the method as described in 605-645 further comprises assigning the fourth memory object 212-4 to the cache 213 for read-only access by one or more of the plurality of processing threads 206.

Figure 6C:
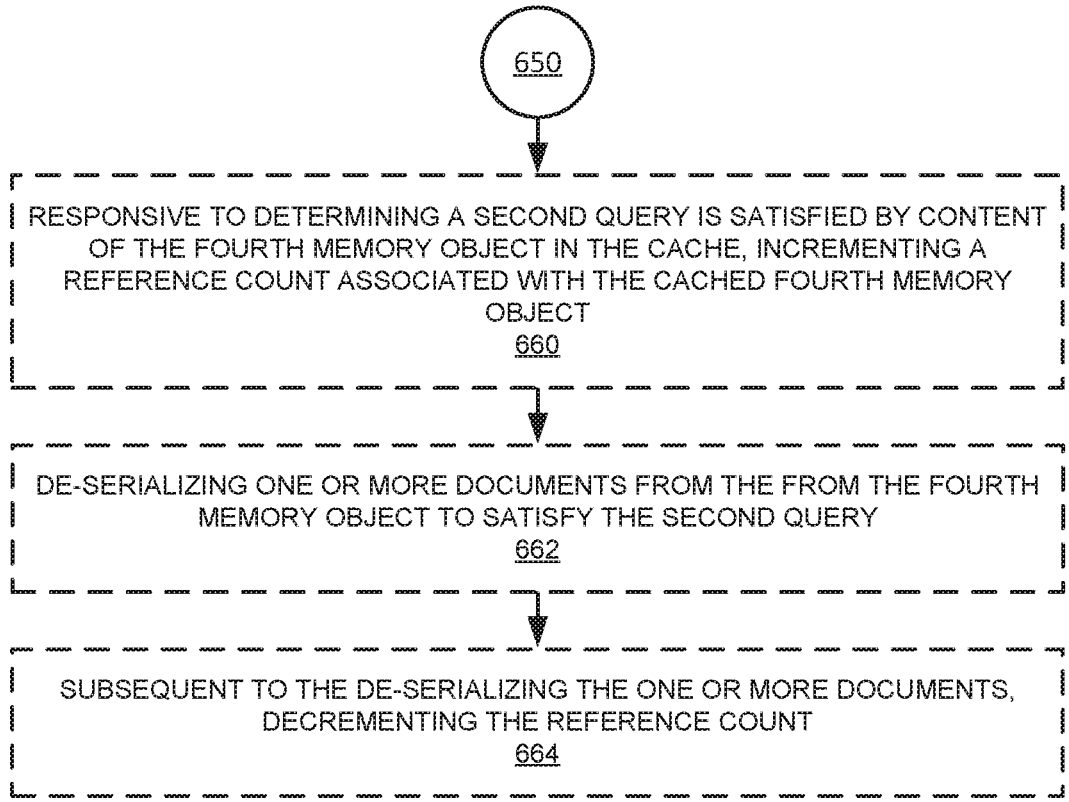

Referring now to FIG. 6C responsive to determining a second query is satisfied by content of the fourth memory object in the cache, at 660 of flow diagram 600, in one embodiment, the method as described in 650 further comprises, incrementing a reference count 505 associated with the cached fourth memory object 212-4. For example, the reference count 505 may be added to, a part of, or associated with segment 500. The reference count 505 is incremented by one to indicate that a call has been made to memory object 212-4, and is currently in process. This prevents memory object 212-4 being recycled while it is still being read.

At 662 of flow diagram 600, in one embodiment, the method as described in 660 further comprises de-serializing one or more documents 130 from the fourth memory object 212-4 to satisfy the second query.

At 664 of flow diagram 600 subsequent to the de-serializing the one or more documents, in one embodiment, the method as described in 662 further comprises, decrementing the reference count 505. The decrementing signifies that the call is complete and that the processing thread is no longer reading from the memory object 212-4.

Figure 6D:
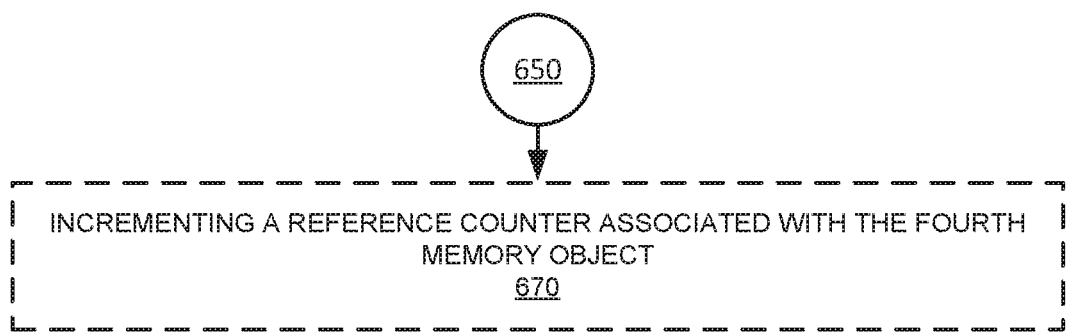

Referring now to FIG. 6D, at 670 of flow diagram 600, in one embodiment, the method as described in 650 further comprises incrementing a reference count 505 associated with the fourth memory object 212-4 upon assignment to cache 213 for read-only access by one or more of the plurality of processing threads 206. The incrementing raises the count of the reference count 505 from zero to an initial value of one upon assignment to the cache. If the value of the reference count 505 ever gets to zero, the memory object 212-4 is ejected from cache 213 and released back to memory object pool 211.

Figure 6E:
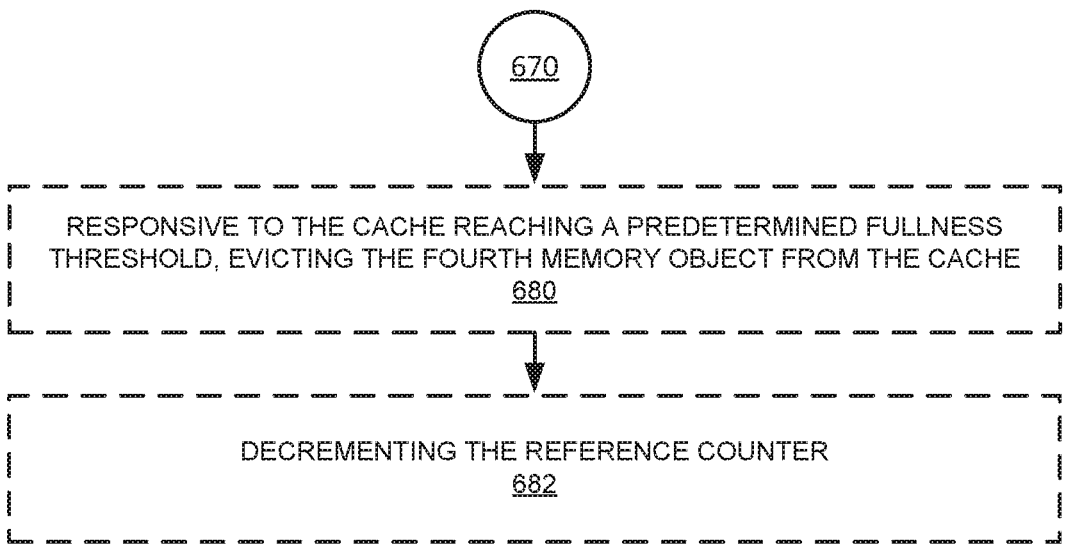

Referring now to FIG. 6E, responsive to the cache 213 reaching a predetermined fullness threshold, at 680 of flow diagram 600, in one embodiment, the method as described in 670 further comprises evicting the fourth memory object 212-4 from the cache 213. The fullness threshold may be reached when the cache fills all of its reserved space, when some percentage of the reserved space such as 97% is used, when room is needed to add a new memory object, etc. Memory objects may be selected for rejection based on age in the cache, size of reference count 505 (e.g., smallest reference count), or some other criterion.

At 682 of flow diagram 600, in one embodiment, the method as described in 680 further comprises decrementing the reference count 505 upon the ejection. This decrementing may be performed by the memory manager 260, in some embodiments.

Figure 6F:
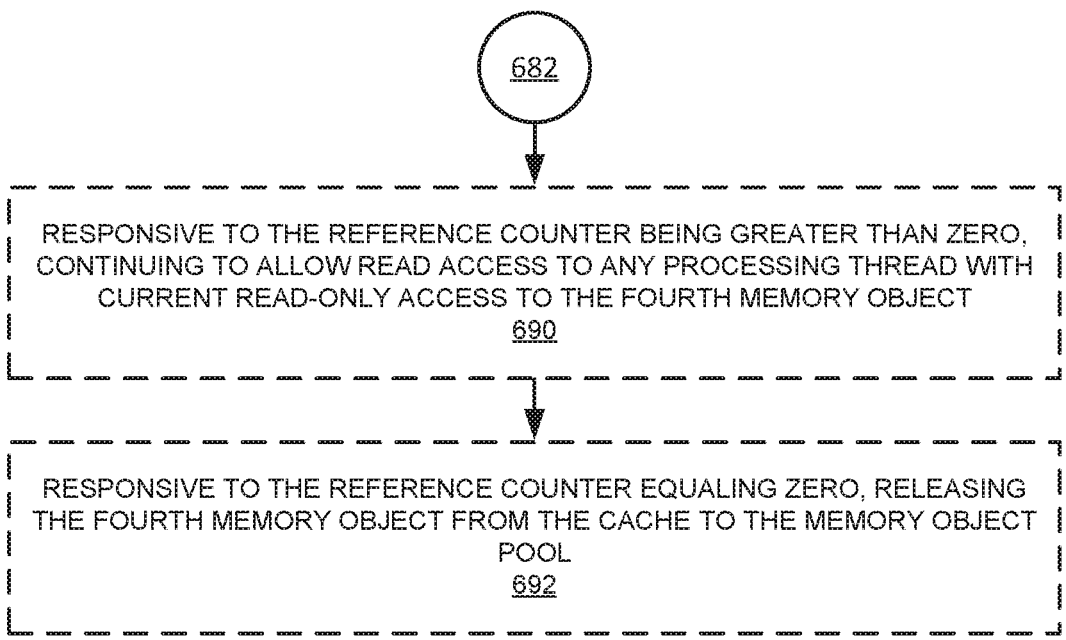

Referring now to FIG. 6F, responsive to the reference count 505 being greater than zero, at 690 of flow diagram 600, in one embodiment, the method as described in 682 further comprises, continuing to allow read access to any processing thread with current read-only access to the fourth memory object 212-4. That is, any processing thread which has incremented the reference count 505 may continue to read from memory object 212-4 until it is finished had signifies this finishing by decrementing the reference count 505.

At 692 of flow diagram 600, responsive to the reference count 505 equaling zero, in one embodiment, the method as described in 690 further comprises, releasing the fourth memory object 212-4 from the cache 213 to the memory object pool 211. The reference count 505 will get to zero after the ejection decrement and after all calling threads also decrement the reference count 505 after completion of their respective calls to the memory object 212-4.

FIG. 7A is a flow diagram 700 of a method of memory use in a distributed index and query system (such as distributed index and query system 100), in accordance with various embodiments. Reference is made to items in FIGS. 1, 2A, 2B, 3, 4, 5, and 6A-6E in the description of flow diagram 700.

At 730 of flow diagram 700 in response to a query 140 being unsatisfied by content of a cache 213 within a memory 210, in one embodiment, the method comprises, reading, by a processing thread (e.g., processing thread 206-3) of a plurality of processing threads, a first segment 400 from a data storage device 215 into a first memory object 212-3 exclusively borrowed by the processing thread 206-3 from a memory object pool 211 of the memory 210. The first segment 400 comprises a compressed serialized data array 430, an offset index 320 describing locations of documents 130 in an uncompressed version (e.g., serialized data array 330) of the compressed serialized data array 430, and a document count 310 describing a total number of the documents in the compressed serialized data array 430.

At 735 of flow diagram 700, in one embodiment, the method comprises decompressing, by the processing thread 206-3, the compressed serialized data array 430 into a second memory object 212-4 exclusively borrowed by the processing thread 206-3 from the memory object pool 211 to achieve a second segment 500 comprising the decompressed version 530 of the serialized data array, the offset index 320, and the document count 310. As previously noted decompressed serialized data array 530 is identical to serialized data array 330.

At 740 of flow diagram 700, in one embodiment subsequent to the decompressing, the method as described in 735 further comprises, releasing the first memory object 212-3 back to the memory object pool 211 for exclusive borrowing by any processing thread of the plurality of processing threads 206.

At 745 of flow diagram 700, in one embodiment, the method as described in 740 further comprises de-serializing, by the processing thread 206-3, the queried document(s) from segment 500 in the second memory object 212-4 in order to satisfy the query 140.

At 750 of flow diagram 700, in one embodiment, the method as described in 745 further comprises assigning the second memory object 212-4 to the cache 213 for read-only access by one or more of the plurality of processing threads 206.

Referring now to FIG. 7B responsive to determining a second query is satisfied by content of the second memory object 212-4 in the cache 213, at 760 of flow diagram 700, in one embodiment, the method as described in 750 further comprises, incrementing a reference count 505 associated with the cached second memory object 212-4. For example, the reference count 505 may be added to, a part of, or associated with segment 500. The reference count is incremented by one to indicate that a call has been made to memory object 212-4, and is currently in process. This prevents memory object 212-4 being recycled while it is still being read.

At 762 of flow diagram 700, in one embodiment, the method as described in 760 further comprises de-serializing one or more documents 130 from the second memory object 212-4 to satisfy the second query.

At 764 of flow diagram 700 subsequent to the de-serializing the one or more documents, in one embodiment, the method as described in 762 further comprises, decrementing the reference count 505. The decrementing signifies that the call is complete and that the processing thread is no longer reading from the memory object 212-4.

Referring now to FIG. 7C, at 770 of flow diagram 700, in one embodiment, the method as described in 750 further comprises incrementing a reference count 505 associated with the second memory object 212-4 upon assignment to cache 213 for read-only access by one or more of the plurality of processing threads 206. The incrementing raises the count of the reference count 505 from zero to an initial value of one upon assignment to the cache. If the value of the reference count 505 ever gets to zero, the memory object 212-4 is ejected from cache 213 and released back to memory object pool 211.

Figure 7D:
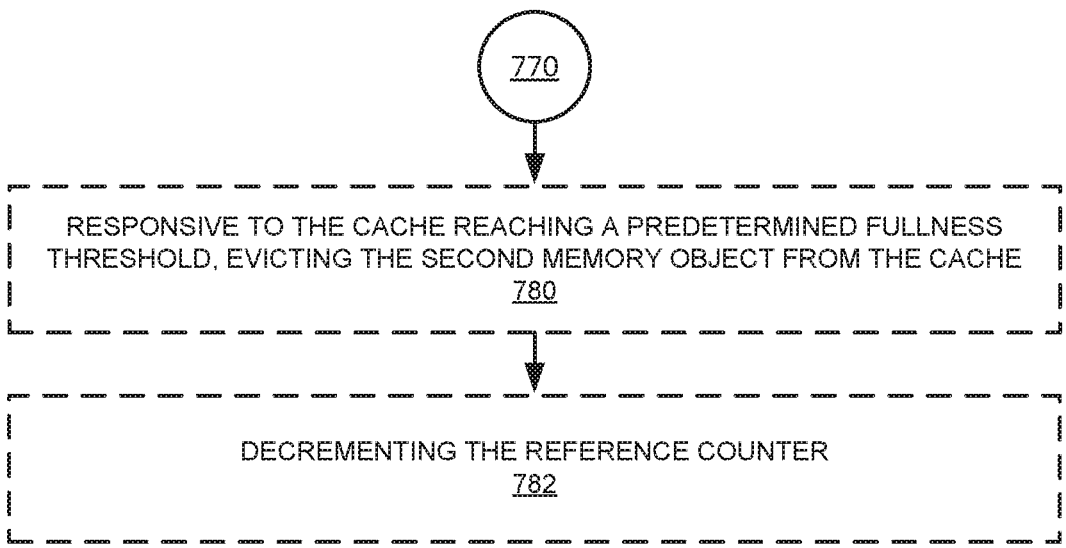

Referring now to FIG. 7D, responsive to the cache 213 reaching a predetermined fullness threshold, at 780 of flow diagram 700, in one embodiment, the method as described in 770 further comprises evicting the second memory object 212-4 from the cache 213. The fullness threshold may be reached when the cache fills all of its reserved space, when some percentage of the reserved space such as 97% is used, when room is needed to add a new memory object, etc. Memory objects may be selected for rejection based on age in the cache, size of reference count 505 (e.g., smallest reference count), or some other criterion.

At 782 of flow diagram 700, in one embodiment, the method as described in 680 further comprises decrementing the reference count 505 upon the ejection. This decrementing may be performed by the memory manager 260, in some embodiments.

Figure 7E:
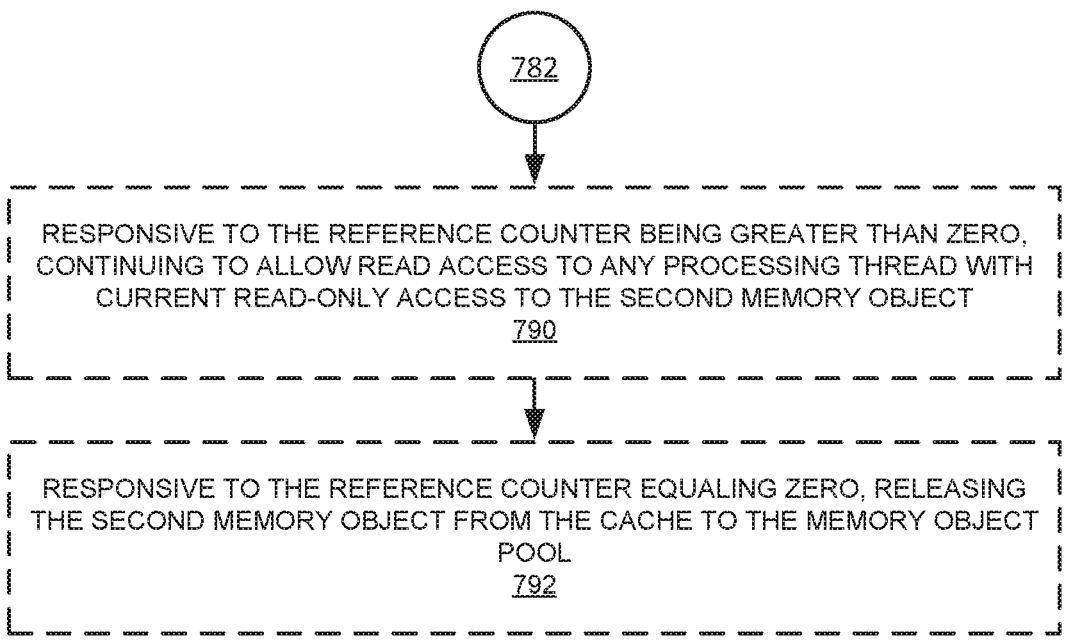

Referring now to FIG. 7E, responsive to the reference count 505 being greater than zero, at 790 of flow diagram 700, in one embodiment, the method as described in 782 further comprises, continuing to allow read access to any processing thread with current read-only access to the second memory object 212-4. That is, any processing thread which has incremented the reference count 505 may continue to read from memory object 212-4 until it is finished had signifies this finishing by decrementing the reference count 505.

At 792 of flow diagram 700, responsive to the reference count 505 equaling zero, in one embodiment, the method as described in 690 further comprises, releasing the second memory object 212-4 from the cache 213 to the memory object pool 211. The reference count 505 will get to zero after the ejection decrement and after all calling threads also decrement the reference count 505 after completion of their respective calls to the memory object 212-4.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

I claim:

1. A method of memory use in an index and query system of a distributed computing system to streamline memory allocation in said distributed computing system, the method comprising:

serializing, by a first processing thread of a plurality of processing threads, a list of documents into a first memory object exclusively borrowed by the first processing thread from a memory object pool of a memory to achieve a first segment comprising a serialized data array of the documents, an offset index describing locations of the documents in the serialized data array, and a document count describing a number of the documents, wherein a memory manger allocates said first memory object without altering a size of said first memory object, said memory manager not required to perform compaction processes prior to allocating said first memory object, and such that said memory allocation is streamlined in said distributed computing system;

compressing, by the first processing thread, the serialized data array into a second memory object exclusively borrowed by the first processing thread from the memory object pool to achieve a second segment comprising a compressed serialized data array, the offset index, and the document count;

subsequent to the compressing, releasing the first memory object back to the memory object pool for exclusive borrowing by any processing thread of the plurality of processing threads to reduce contention of said distributed computing system;

writing the second segment to a data storage device; and subsequent to the writing, releasing the second memory object back to the memory object pool for exclusive borrowing by any processing thread of the plurality of processing threads to reduce contention of said distributed computing system.

2. The method as recited in claim 1, further comprising:

in response to a query for a document in the second segment being unsatisfied by content of a cache of the memory, reading, by a second processing thread of the plurality of processing threads, the second segment from the data storage device into a third memory object exclusively borrowed by the second processing thread from the memory object pool;

decompressing, by the second processing thread, the compressed serialized data array into a fourth memory object exclusively borrowed by the second processing thread from the memory object pool to re-achieve the first segment comprising the serialized data array, the offset index, and the document count;

subsequent to the decompressing, releasing the third memory object back to the memory object pool for exclusive borrowing by any processing thread of the plurality of processing threads;

de-serializing, by the second processing thread, the document from the fourth memory object to satisfy the query; and assigning the fourth memory object to the cache for read-only access by one or more of the plurality of processing threads.

3. The method as recited in claim 2, further comprising:

responsive to determining a second query is satisfied by content of the fourth memory object in the cache, incrementing a reference count associated with the cached fourth memory object;

de-serializing one or more documents from the fourth memory object to satisfy the second query; and subsequent to the de-serializing the one or more documents, decrementing the reference count.

4. The method as recited in claim 2, wherein the assigning the fourth memory object to the cache for read-only access by one or more of the plurality of processing threads further comprises:

incrementing a reference count associated with the fourth memory object.

5. The method as recited in claim 4, further comprising:

responsive to the cache reaching a predetermined fullness threshold, evicting the fourth memory object from the cache; and decrementing the reference count.

6. The method as recited in claim 5, further comprising:

responsive to the reference count being greater than zero, continuing to allow read access to any processing thread with current read-only access to the fourth memory object; and responsive to the reference count equaling zero, releasing the fourth memory object from the cache to the memory object pool.

7. The method as recited in claim 1, wherein the serializing further comprises:

responsive to the first memory object containing fewer memory bytes than needed for achieving the first segment, allocating additional memory bytes from the memory to the first memory object to increase an overall size of the first memory object.

8. The method as recited in claim 1, wherein the serializing further comprises:

responsive to the first memory object containing excess memory bytes over what are needed for achieving the first segment, using the first memory object without trimming the excess memory bytes from the first memory object.

9. The method as recited in claim 1, wherein the compressing, by the first processing thread, the serialized data array into a second memory object exclusively borrowed by the first processing thread from the memory object pool to achieve a second segment comprising a compressed serialized data array, the offset index, and the document count comprises:

swapping bytes comprising the offset index from the first memory object into the second memory object.

10. A non-transitory computer readable storage medium having computer readable program code stored thereon for causing a computer system to perform a method of memory use in an index and query system of a distributed computing system to streamline memory allocation in said distributed computing system, the method comprising:

in response to a query being unsatisfied by content of a cache within a memory, reading, by a processing thread of a plurality of processing threads, a first segment from a data storage device into a first memory object exclusively borrowed by the processing thread from a memory object pool of the memory, said memory associated with said index and query system of said distributed computing system, the first segment comprising a compressed serialized data array, an offset index describing locations of documents in an uncompressed version of the compressed serialized data array, and a document count describing a number of the documents in the compressed serialized data array, wherein a memory manger allocates said first memory object without altering a size of said first memory object, said memory manager not required to perform compaction processes prior to allocating said first memory object, and such that said memory allocation is streamlined in said distributed computing system;

decompressing, by the processing thread, the compressed serialized data array into a second memory object exclusively borrowed by the processing thread from the memory object pool to achieve a second segment comprising the decompressed version of the serialized data array, the offset index, and the document count;

subsequent to the decompressing, releasing the first memory object back to the memory object pool for exclusive borrowing by any processing thread of the plurality of processing threads to reduce contention of said distributed computing system;

de-serializing, by the processing thread, a document from the second memory object to satisfy the query; and assigning the second memory object to the cache for read-only access by one or more of the plurality of processing threads to reduce contention of said distributed computing system.

11. The non-transitory computer readable storage medium as recited in claim 10, further comprising:

responsive to determining a second query is satisfied by content of the second memory object in the cache, incrementing a reference count associated with the cached second memory object;

de-serializing one or more documents from the second memory object to satisfy the second query; and subsequent to the de-serializing the one or more documents, decrementing the reference count.

12. The non-transitory computer readable storage medium as recited in claim 10, wherein the assigning the second memory object to the cache for read-only access by one or more of the plurality of processing threads further comprises:

incrementing a reference count associated with the second memory object.

13. The non-transitory computer readable storage medium as recited in claim 12, further comprising:

responsive to the cache reaching a predetermined fullness threshold, evicting the second memory object from the cache; and decrementing the reference count.

14. The non-transitory computer readable storage medium as recited in claim 13, further comprising:

responsive to the reference count being greater than zero, continuing to allow read access to any processing thread with current read-only access to the second memory object; and responsive to the reference count equaling zero, releasing the second memory object from the cache to the memory object pool.

15. An index and query system of a distributed computing system, said index and query system streamlining memory allocation in said distributed computing system, said system comprising:

a data storage device;

a plurality of processors, the plurality of processors comprising a plurality of processing threads; and a memory coupled with said data storage device and said plurality of processors, said memory associated with said index and query system of said distributed computing system, said memory comprising:

a memory object pool comprising a plurality of memory objects; and a cache;

wherein a first processing thread of the plurality of processing threads is configured to:

serialize a list of documents into a first memory object exclusively borrowed by the first processing thread from the memory object pool to achieve a first segment comprising a serialized data array of the documents, an offset index describing locations of the documents in the serialized data array, and a document count describing a number of the documents, wherein a memory manger borrows said first memory object without altering a size of said first memory object, said memory manager not required to perform compaction processes prior to borrowing said first memory object, and such that said memory allocation is streamlined in said distributed computing system;

compress the serialized data array into a second memory object exclusively borrowed by the first processing thread from the memory object pool to achieve a second segment comprising a compressed serialized data array, the offset index, and the document count;

subsequent to the compression, release the first memory object back to the memory object pool for exclusive borrowing by any processing thread of the plurality of processing threads to reduce contention of said distributed computing system;

writing the second segment to a data storage device; and subsequent to the writing, release the second memory object back to the memory object pool for exclusive borrowing by any processing thread of the plurality of processing threads to reduce contention of said distributed computing system.

16. The distributed index and query system of claim 15, wherein in response to a query for a document in the second segment being unsatisfied by content of the cache, a second thread of the plurality of processing threads is configured to:

read the second segment from the data storage device into a third memory object exclusively borrowed by the second processing thread from the memory object pool;

decompress the compressed serialized data array into a fourth memory object exclusively borrowed by the second processing thread from the memory object pool to re-achieve the first segment comprising the serialized data array, the offset index, and the document count;

subsequent to the decompression, release the third memory object back to the memory object pool for exclusive borrowing by any processing thread of the plurality of processing threads;

de-serialize the document from the fourth memory object to satisfy the query; and assign the fourth memory object to the cache for read-only access by one or more of the plurality of processing threads.

17. The distributed index and query system of claim 16, wherein a reference count is associated with the fourth memory object, and wherein a count of the reference count signifies an amount of utilization read-only utilization of the fourth memory object while assigned to the cache.

18. The distributed index and query system of claim 15, wherein the compression, by the first processing thread, is further configured to swap bytes comprising the offset index from the first memory object into the second memory object rather than copy the offset index from the first memory object into the second memory object.

19. The distributed index and query system of claim 15, wherein responsive to the first memory object containing fewer memory bytes than needed for achieving the first segment, the memory manager is configured to allocating additional memory bytes from the memory to the first memory object to increase an overall size of the first memory object.

20. The distributed index and query system of claim 15, wherein responsive to the first memory object containing excess memory bytes over what are needed for achieving the first segment, the memory manager is configured to allow use of the first memory object without trimming the excess memory bytes from the first memory object.

\* \* \* \* \*